US006428878B1

(12) United States Patent
Kronzer

(10) Patent No.: US 6,428,878 B1
(45) Date of Patent: *Aug. 6, 2002

(54) HEAT TRANSFER MATERIAL HAVING A FUSIBLE COATING CONTAINING CYCLOHEXANE DIMETHANOL DIBENZOATE THEREON

(75) Inventor: Francis J. Kronzer, Woodstock, GA (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/271,645

(22) Filed: Mar. 18, 1999

(51) Int. Cl.[7] ................................................ B32B 3/00

(52) U.S. Cl. ........................ 428/195; 428/913; 428/914

(58) Field of Search ................................ 428/195, 212, 428/323, 913, 914; 503/227

(56) References Cited

U.S. PATENT DOCUMENTS

| | | | | |
|---|---|---|---|---|
| 3,359,127 A | | 12/1967 | Meyer et al. | |
| 3,616,176 A | | 10/1971 | Jachimowicz | |
| 3,872,040 A | | 3/1975 | Mollohan et al. | |
| 4,303,717 A | | 12/1981 | Andrews | |
| 4,322,467 A | | 3/1982 | Heimbach et al. | |
| 4,536,434 A | | 8/1985 | Magnotta | |
| 4,863,781 A | | 9/1989 | Kronzer | |
| 4,929,501 A | | 5/1990 | Okada et al. | |
| 5,026,756 A | | 6/1991 | Arendt | |
| 5,064,743 A | | 11/1991 | Koshizuka et al. | |
| 5,087,527 A | | 2/1992 | Shimura et al. | |
| 5,139,917 A | | 8/1992 | Hare | |
| 5,151,326 A | | 9/1992 | Matsuda et al. | |
| 5,242,739 A | | 9/1993 | Kronzer et al. | |
| 5,248,543 A | | 9/1993 | Yamaguchi et al. | |
| 5,286,521 A | | 2/1994 | Matsuda et al. | |
| 5,356,963 A | * | 10/1994 | Kauffman et al. | 542/43 |
| 5,362,703 A | | 11/1994 | Kawasaki et al. | |
| 5,372,987 A | | 12/1994 | Fisch et al. | |
| 5,372,988 A | | 12/1994 | Takeuchi et al. | |
| 5,413,841 A | | 5/1995 | Mahn, Sr. et al. | |
| 5,484,644 A | | 1/1996 | Imamura et al. | |
| 5,501,902 A | | 3/1996 | Kronzer | |
| 5,739,188 A | | 4/1998 | Desai | |
| 5,795,695 A | | 8/1998 | Malhorta et al. | |
| 5,798,179 A | | 8/1998 | Kronzer | |
| 5,853,864 A | | 12/1998 | Bunnelle | |
| 5,945,375 A | * | 8/1999 | Kronzer | 503/227 |

FOREIGN PATENT DOCUMENTS

| | | | | |
|---|---|---|---|---|
| EP | 699800 | * | 6/1996 | D21H/19/28 |
| EP | 820874 A1 | | 1/1998 | |
| GB | 2243332 A | | 10/1991 | |
| WO | 90/00473 | | 1/1990 | |
| WO | 91/06433 | | 5/1991 | |
| WO | 95/08419 | | 3/1995 | |
| WO | 98/43822 | | 10/1998 | |

* cited by examiner

*Primary Examiner*—Bruce H. Hess
*Assistant Examiner*—Michael E. Grendzynski
(74) *Attorney, Agent, or Firm*—Kilpatrick Stockton LLP

(57) ABSTRACT

The present invention is directed to a printable fusible coating for use on a heat transfer material, wherein the fusible coating contains cyclohexane dimethanol dibenzoate. The present invention is further directed to a printable heat transfer material having a fusible coating thereon, wherein the fusible coating contains cyclohexane dimethanol dibenzoate. The present invention also is directed to a method of making a printable heat transfer material having a fusible coating thereon, wherein the fusible coating contains cyclohexane dimethanol dibenzoate.

19 Claims, No Drawings

HEAT TRANSFER MATERIAL HAVING A FUSIBLE COATING CONTAINING CYCLOHEXANE DIMETHANOL DIBENZOATE THEREON

TECHNICAL FIELD

The present invention is directed to heat transfer materials, and in particular, heat transfer materials having a fusible coating thereon.

BACKGROUND OF THE INVENTION

A number of U.S. and International Patents disclose the use of cyclohexane dimethanol dibenzoate in a variety of compositions. U.S. Pat. No. 5,026,756 discloses a hot melt adhesive composition containing cyclohexane dimethanol dibenzoate as a plasticizer. U.S. Pat. No. 5,739,188 also discloses the use of cyclohexane dimethanol dibenzoate as a plasticizer in a thermoplastic composition. U.S. Pat. No. 5,795,695 discloses a xerographic transparency containing cyclohexane dimethanol dibenzoate as an adhesion promoter. U.S. Pat. No. 5,853,864 discloses disposable absorbent articles containing cyclohexane dimethanol dibenzoate as a plasticizer in an adhesive layer of the article. Further, WO 98/43822 discloses thermal dye diffusion coatings containing cyclohexane dimethanol dibenzoate. Although cyclohexane dimethanol dibenzoate has been used as a plasticizer and/or adhesion promoter in a variety of applications, the use has been limited.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for a specific end-use and are printed on a release or transfer paper. The graphics are transferred to the article of clothing by means of heat and pressure, after which die release or transfer paper is removed.

Heat transfer papers having an enhanced receptivity for images made by wax-based crayons, thermal printer ribbons, and impact ribbon or dot-matrix printers, are well known in the art. Typically, a heat transfer sheet comprises a cellulosic base sheet and an image-receptive coating on a surface of the base sheet. The image-receptive coating usually contains one or more film-forming polymeric binders, as well as, other additives to improve the transferability and printability of the coating. Other heat transfer sheets comprise a cellulosic base sheet and an image-receptive coating, wherein the image-receptive coating is formed by melt extrusion or by laminating a film to the base sheet. The surface of the coating or film may then be roughened by, for example, passing the coated base sheet through an embossing roll.

Much effort has been directed at generally improving the transferability of an image-bearing laminate (coating) to a substrate. For example, an improved cold-peelable heat transfer material has been described in U.S. Pat. No. 5,798, 179, which allows removal of the base sheet immediately after transfer of the image-bearing laminate or some time thereafter when the laminate has cooled. Moreover, additional effort has been directed to improving the crack resistance and washability of the transferred laminate. The transferred laminate must be able to withstand multiple wash cycles and normal "wear and tear" without cracking or fading.

Various plasticizers and coating additives have been added to coatings of heat transfer materials to improve the crack resistance and washability of image-bearing laminates on articles of clothing. However, most plasticizers in use today are unable to significantly improve cracking without negatively impacting the washability of the coating. Cracking and fading of the transferred image-bearing coating continues to be a problem in the art of heat transfer coatings.

What is needed in the art is a heat fusible coating, which substantially resists cracking while maintaining or enhancing the washability of the coating. What is also needed in the art is a heat transfer material having a heat fusible coating thereon, wherein the heat fusible coating has improved crack resistance, fade resistance, and washability.

SUMMARY OF THE INVENTION

The present invention addresses some of the difficulties and problems discussed above by the discovery of a heat fusible coating for use on a heat transfer material, wherein the fusible coating resists cracking and fading, while having substantially no negative impact on the washability of the coated article. The heat fusible coating of the present invention comprises cyclohexane dimethanol dibenzoate, which lowers the melt viscosity of the transfer coating and provides a softer hand to the coating.

The present invention is further directed to a printable heat transfer material having a heat fusible coating thereon, wherein the heat fusible coating comprises cyclohexane dimethanol dibenzoate. The heat transfer material of the present invention comprises a base substrate and one or more coatings on a surface of the base substrate, wherein at least one coating contains cyclohexane dimethanol dibenzoate.

The present invention also is directed to a method of making a printable heat transfer material having a heat fusible coating thereon, wherein the heat fusible coating contains cyclohexane dimethanol dibenzoate. The method comprises applying cyclohexane dimethanol dibenzoate in an unfused state onto a base substrate of a heat transfer material.

These and other features and advantages of the present invention will become apparent after a review of the following detailed description of the disclosed embodiments and the appended claims.

DETAILED DESCRIPTION OF THE INVENTION

The present invention is directed to a heat fusible coating for use on a heat transfer material, wherein the fusible coating resists cracking and fading, while having substantially no negative impact on the washability of the image-bearing coating. The heat fusible coating of the present invention may be used for a number of applications, in particular, heat transfer applications.

The heat fusible coating of the present invention comprises cyclohexane dimethanol dibenzoate. The cyclohexane dimethanol dibenzoate enables the production of a heat fusible coating, which lowers the melt viscosity of the transfer coating and provides a softer hand to the coating. Cyclohexane dimethanol dibenzoate is commercially available from Velsicol® Chemical Corporation (Rosemont, Ill.) under the tradename Benzoflex® 352. Benzoflex® 352 comprises a mixture of cis and trans isomers of 1,4-cyclohexane dimethanol dibenzoate and is available in flake form.

In one embodiment of the present invention, the heat fusible coating comprises Benzoflex® 352 having a particle size smaller than the commercially available flakes. In this embodiment, the flakes of Benzoflex® 352 are ground to a desired particle size. As used herein the phrase "particle size" refers to the average dimensions (i.e., length, width, diameter, etc.) of the particles. Desirably, the heat fusible coating comprises Benzoflex® 352 particles having a particle size of less than 50 microns. More desirably, the particle size is from about 1 micron to about 30 microns. Even more desirably, the particle size is from about 2 microns to about 10 microns.

The Benzoflex® 352 particles have a melting point of about 120° C. The particles can be incorporated into a coating composition in an unfused state, applied to a heat transfer sheet base substrate, and dried at a temperature lower than the melting point. This provides several advantages. The dried coating is readily fused when desired. Further, the unfused coating, containing the Benzoflex® 352 particles, is relatively porous, dull and tack-free, which enhances the printability of the coating. Once fused, the coating is closed, more glossy, and quite tacky, at intermediate levels of plasticizer.

The ground Benzoflex® 352 powder may be easily dispersed in water using a small amount of surfactant. Suitable surfactants include, but are not limited to, Triton® X100, a nonionic surfactant available from Union Carbide, and Tergitol® 15-S40, an ethoxylated alcohol surfactant available from BASF. The amount of surfactant may vary depending on the amount of Benzoflex® 352 particles and other mixture components. Desirably, the amount of surfactant is less than about 10 wt % of the total weight of the mixture. More desirably, the amount of surfactant is from about 1 wt % to about 5 wt % of the total weight of the mixture.

The present invention is further directed to a printable heat transfer material having a heat fusible coating thereon, wherein at least one layer of the heat fusible coating comprises cyclohexane dimethanol dibenzoate. The printable heat transfer material of the present invention comprises at least one base substrate and one or more of the following layers: a release coating layer, a tie coating layer, a base coating layer, a print coating layer, and a top coating layer. Suitable base substrates include, but are not limited to, cellulosic nonwoven webs and polymeric films. A number of suitable base substrates are disclosed in U.S. Pat. Nos. 5,242,739; 5,501,902; and 5,798,179; the entirety of which is incorporated herein by reference. Desirably, the base substrate comprises paper.

The heat transfer material of the present invention may further comprise a release coating layer. The release coating layer may be positioned next to or separate from the base substrate. The release coating layer enables cold removal of at least the base substrate from the fused coating after an image transfer is completed. Desirably, the release coating layer is adjacent to a surface of the base substrate. A number of release coating layers are known to those of ordinary skill in the art, any of which may be used in the present invention. Typically, the release coating layer comprises a thermoplastic polymer having essentially no tack at transfer temperatures (e.g. 177° C.) and a glass transition temperature of at least about 0° C. As used herein, the phrase "having essentially no tack at transfer temperatures" means that the release coating layer does not stick to an overlaying layer to an extent sufficient to adversely affect the quality of the transferred image. Desirably, the thermoplastic polymer comprises a hard acrylic polymer or poly(vinyl acetate). The release coating layer may further comprise an effective amount of a release-enhancing additive, such as a divalent metal ion salt of a fatty acid, a polyethylene glycol, or a mixture thereof. For example. the release-enhancing additive may be calcium stearate, a polyethylene glycol having a molecular weight of from about 2,000 to about 100,000, or a mixture thereof. Suitable release coating layers are disclosed in U.S. Pat. No. 5,798,179, the entirety of which is incorporated herein by reference.

The heat transfer material of the present invention may further comprise a tie coating layer. The tie coating layer may be positioned next to or separate from the base substrate. Desirably, the tie coating is directly above the release coating layer, when present, so as to provide a desired amount of adhesion between the release coating layer and an overlaying layer, such as a base coating layer. The tie coating layer provides an adequate amount of adhesion for manufacture, sheeting, handling, and printing of the heat transfer material, yet low enough adhesion for easy release after transfer. A number of tie coating layers are known to those of ordinary skill in the art, any of which may be used in the present invention. Suitable tie coating layers for use in the present invention are disclosed in U.S. Pat. No. 5,798,179, the entirety of which is incorporated herein by reference.

In one embodiment of the present invention, the tie coating layer of the heat transfer material comprises a powdered thermoplastic polymer, which melts in a range of from about 65° C. to about 180° C., and at least one film-forming binder material. Any powdered thermoplastic polymer and film-forming binder may be employed in the present invention as long as the materials meet the criteria set forth above for a tie layer coating. Suitable powdered thermoplastic polymer include, but are not limited to, polyamides, polyolefins, polyesters, ethylene-vinyl acetate copolymers, or a combination thereof. Desirably, the powdered thermoplastic polymer comprises Micropowder MPP635, a high-density polyethylene powder available from Micropowders, Inc., Tarrytown, N.Y., or Orgasol® 3501 EXDNAT 1, a 10 micron average particle size, porous copolymer of nylon-6 and nylon-12 precursors, available from Elf Atochem North America, Philadelphia, Pa. Suitable film-forming binders include, but are not limited to, water-dispersible ethylene-acrylic acid copolymers. Desirably, the film-forming binder comprises Michleman Emulsion 58035, a 35 wt % solids ethylene-acrylic acid emulsion available from Michleman Chemical Company, Cincinnati, Ohio.

In an alternative embodiment of the present invention, the tie coating layer may be a melt-extruded film. The materials of the melt-extruded film may be the same as those described above for the solution-coated, tie coating layer. Suitable melt-extrudable polymers include, but are not limited to, copolymers of ethylene and acrylic acid, methacrylic acid, vinyl acetate, ethyl acetate, butyl acrylate, polyesters, polyamides, polyurethanes, and combinations thereof. The polymer melt composition may include one or more additives. Suitable additives include, but are not limited to, waxes, plasticizers, rheology modifiers, antioxidants, antistatic agents, and anti-blocking agents. Suitable melt-extrudable tie coating layers for use in the present invention are disclosed in U.S. Pat. No. 5,798,179, the entirety of which is incorporated herein by reference.

The heat transfer material of the present invention may further comprise a base coating layer. The base coating layer may be used in combination with one or more of the above-described layers. Alternatively, the base coating layer may be used instead of the tie coating layer or both the release coating layer and the tie coating layer. The base coating layer may comprise materials similar to those described above for the tie coating layer. The base coating layer may comprise one or more powdered thermoplastic polymer and one or more film-forming binders as described above. Desirably, the base coating layer comprises from about 10 wt % to about 90 wt % of one or more powdered thermoplastic polymer and from about 90 wt % to about 10 wt % of one or more film-forming binders, based on the total weight of the dry base coating layer. More desirably, the base coating layer comprises from about 10 wt % to about 50 wt % of one or more powdered thermoplastic polymer and from about 90 wt % to about 50 wt % of one or more film-forming binders, based on the total weight of the dry base coating layer. Even more desirably, the base coating layer comprises from about 20 wt % to about 40 wt % of one or more powdered thermoplastic polymer and from about 80 wt % to about 60 wt % of one or more film-forming binders, based on the total weight of the dry base coating layer.

In one embodiment of the present invention, the base coating layer comprises powdered thermoplastic polymer in the form of high-density polyethylene powder, copolyamide particles, or a combination thereof, and a film-forming binder in the form of an ethylene-acrylic acid copolymer, a polyethylene oxide, or a combination thereof. As disclosed in U.S. Pat. No. 5,798,179, other materials may be added to the base coating layer including, but not limited to, plasticizers, surfactants, and viscosity modifiers. Desirably, the base coating layer comprises up to about 5 wt % of one or surfactants and up to about 2 wt % of one or more viscosity modifiers, based on the total weight of the dry base coating layer. Suitable surfactants include, but are not limited to, ethoxylated alcohol surfactant available from BASF under the tradename Tergitol® 15-S40 and a nonionic surfactant available from Union Carbide under the tradename Triton® X100. Suitable viscosity modifiers include, but are not limited to, polyethylene oxide available from Union Carbide under the tradename Polyox® N60K and methylcellulose.

In a further embodiment of the present invention, the base coating layer comprises cyclohexane dimethanol dibenzoate in combination with one or more powdered thermoplastic polymers and/or one or more film-forming binders. The amount of cyclohexane dimethanol dibenzoate in the base coating layer may vary depending on the overall coating composition. Desirably, the amount of cyclohexane dimethanol dibenzoate in the base coating layer is up to about 90 wt % based on the total weight percent of the dry base coating layer. More desirably, the amount of cyclohexane dimethanol dibenzoate in the base coating layer is from about 10 wt % to about 50 wt % based on the total weight percent of the dry base coating layer.

When the base coating layer contains cyclohexane dimethanol dibenzoate, one or more powdered thermoplastic polymers, and one or more film-forming binders, the base coating layer desirably comprises from about 10 wt % to about 90 wt % cyclohexane dimethanol dibenzoate, from about 90 wt % to about 10 wt % of one or more powdered thermoplastic polymers, and from about 90 wt % to about 10 wt % of one or more film-forming binders, based on the total weight percent of the dry base coating layer. More desirably, the base coating layer comprises from about 10 wt % to about 50 wt % cyclohexane dimethanol dibenzoate, from about 50 wt % to about 10 wt % of one or more powdered thermoplastic polymers, and from about 70 wt % to about 40 wt % of one or more film-forming binders based on the total weight percent of the dry base coating layer. As disclosed above, other materials may be added to this base coating layer including, but not limited to, plasticizers, surfactants, and viscosity modifiers.

Similar to the tie coating layer above, the base coating layer may be in the form of a melt-extruded film. The extruded film may comprise one or more of the materials described above including the cyclohexane dimethanol dibenzoate. In one embodiment of the present invention, an extruded base coating layer comprises a co-extruded film having a layer of Nucrel® KC500, an ethylene/methacrylic acid copolymer having a melt index of 500 available from Dupont, and a layer of Primacor® 59801, an ethylene-acrylic acid copolymer having a melt index of 200 available from Dow Chemical Company.

In addition to the layers mentioned above, the heat transfer material of the present invention may comprise a print coating layer. The print coating layer provides a print surface for the heat transfer sheet. The print coating layer is formulated to minimize feathering of a printed image and bleeding or loss of the image when the transferred image is exposed to water. Suitable print coating components include, but are not limited to, cyclohexane dimethanol dibenzoate, particulate thermoplastic materials, film-forming binders, a cationic polymer, a humectant, ink viscosity modifiers, weak acids, and surfactants.

The print coating layer may contain one or more thermoplastic particles. Desirably, the particles have a largest dimension of less than about 50 micrometers. More desirably, the particles have a largest dimension of less than about 20 micrometers. Suitable powdered thermoplastic polymers include, but are not limited to, polyolefins, polyesters, polyamides, and ethylene-vinyl acetate copolymers.

The print coating layer may also contain one or more film-forming binders. Desirably, the one or more film-forming binders are present in an amount of from about 10 to about 50 weight percent, based on the weight of the thermoplastic polymer. More desirably, the amount of binder is from about 10 to about 30 weight percent. Suitable binders include, but are not limited to, polyacrylates, polyethylenes, and ethylene-vinyl acetate copolymers. Desirably, the binders are heat-softenable at temperatures of less than or about 120° C.

Further, the print coating layer may comprise a cationic polymer. Desirably, the cationic polymer is present in an amount from about 2 to about 20 weight percent, based on the weight of the thermoplastic polymer. Suitable cationic polymers include, but are not limited to, an amide-epichlorohydrin polymer, polyacrylamides with cationic functional groups, polyethyleneimines, and polydiallylamines.

One or more other components may be used in the print coating layer, such as a humectant and a viscosity modifier. For example, the print coating layer may contain from about 1 to about 20 weight percent of a humectant, based on the weight of the thermoplastic polymer. Suitable humectants include, but are not limited to, ethylene glycol and poly(ethylene glycol). Desirably, the poly(ethylene glycol) has a weight-average molecular weight of from about 100 to about 40,000. More desirably, the poly(ethylene glycol) has a weight-average molecular weight of from about 200 to about 800. In addition, the print coating layer may contain from about 0.2 to about 10 weight percent of an ink viscosity modifier, based on the weight of the thermoplastic polymer. Desirably, the viscosity modifier comprises a poly(ethylene glycol) having a weight-average molecular weight of from about 100,000 to about 2,000,000. More desirably, the poly(ethylene glycol) has a weight-average molecular weight of from about 100,000 to about 600,000.

The print coating layer may also include a weak acid and/or a surfactant. As used herein, the term "weak acid" refers to an acid having a dissociation constant less than one (or a negative log of the dissociation constant greater than 1). Desirably, the weak acid is present in an amount from about 0.1 to about 5 weight percent based on the weight of the thermoplastic polymer. Desirably, the weak acid is citric acid. Suitable surfactants include anionic, nonionic, or cationic surfactants. Desirably, the surfactant is a nonionic or cationic surfactant. Examples of anionic surfactants include, but are not limited to, linear and branched-chain sodium alkylbenzenesulfonates, linear and branched-chain alkyl sulfates, and linear and branched-chain alkyl ethoxy sulfates. Cationic surfactants include, but are not limited to, tallow trimethylammonium chloride. Examples of nonionic surfactants. include, but are not limited to, alkyl polyethoxylates, polyethoxylated alkylphenols, fatty acid ethanol amides, complex polymers of ethylene oxide, propylene oxide, and alcohols, and polysiloxane polyethers. More desirably, the surfactant is a nonionic surfactant.

In one embodiment of the present invention, the print coating layer comprises one or more of the above-described components and cyclohexane dimethanol dibenzoate. The amount of cyclohexane dimethanol dibenzoate in the print coating layer may vary depending on the overall coating composition. Desirably, the amount of cyclohexane dimethanol dibenzoate in the print coating layer is up to about 50 wt % based on the total weight percent of the dry coating layer. More desirably, the amount of cyclohexane dimethanol dibenzoate in the print coating layer is from about 10 wt % to about 30 wt % based on the total weight percent of the dry coating layer. Even more desirably, the amount of cyclohexane dimethanol dibenzoate in the print coating layer is from about 15 wt % to about 25 wt % based on the total weight percent of the dry coating layer.

In a further embodiment of the present invention, the print coating layer comprises a microporous polyamide powder, an ethylene-acrylic acid copolymer binder, a dispersent (Klucel® L hydroxyethyl cellulose), a surfactant (Triton® X100), a buffer (sodium carbonate) and cyclohexane dimethanol dibenzoate. The print coating layer has a porous surface for absorption of ink jet inks.

The heat transfer sheet of the present invention may further comprise a top coating layer. The top coating layer functions as a wetting agent and an ink viscosity modifier. Desirably, the top coating layer comprises one or more cationic polymers. Suitable cationic polymers include, but are not limited to, poly(N,N-dimethylethylamino methacrylate), quaternized with methyl chloride, sold under the tradename, Alcostat® 567 from Allied Colloids. Other materials may be added to the top coating layer including, but not limited to, plasticizers, surfactants, and viscosity modifiers. Suitable viscosity modifiers include, but are not limited to, polyethylene oxide available from Union Carbide under the tradename Polyox® N60K and methylcellulose.

The image-bearing coating of the heat transfer sheet, comprising one or more of the above-described coating layers, may be transferred to an article of clothing, or other porous substrate, by applying heat and pressure to the coating. Desirably, the imaged-bearing coating of the heat transfer sheet melts and penetrates into the interstices of the substrate, as opposed to merely coating the substrate surface. In order to penetrate into a fabric, the combined thickness of the tie, base, print and top coating layers is desirably greater than 1.0 mil. More desirably, the combined thickness of the tie, base, print and top coating layers is about 1.5 to about 2 mils.

The present invention also is directed to a method of making a printable heat transfer material having a heat fusible coating thereon, wherein the heat fusible coating contains cyclohexane dimethanol dibenzoate. The method comprises applying cyclohexane dimethanol dibenzoate in an unfused state onto a base layer of a heat transfer material. In one embodiment of the present invention, one or more of the above-described coating compositions are applied to the base layer by known coating techniques, such as by roll, blade, and air-knife coating procedures. Each individual coating may be subsequently dried by any drying means known to those of ordinary skill in the art. Suitable drying means include, but are not limited to, steam-heated drums, air impingement, radiant heating, or a combination thereof. In an alternative embodiment, one or more of the above-described coating layers may be extrusion coated onto the surface of the base layer or a coating thereon. Any extrusion coating techniques, well known to those of ordinary skill in the art, may be used in the present invention.

If desired, any of the foregoing coating layers may contain other materials, such as processing aids, release agents, pigments, deglossing agents, antifoam agents, and the like. The use of these and similar materials is well known to those having ordinary skill in the art. The layers, which comprise a film-forming binder, may be formed on a given layer by known coating techniques, such as by roll, blade, and air-knife coating procedures. The resulting heat transfer material may then be dried by any drying means known to those of ordinary skill in the art. Suitable drying means include, but are not limited to, steam-heated drums, air impingement, radiant heating, or a combination thereof.

The present invention is further described by the examples which follow. Such examples, however, are not to be construed as limiting in any way either the spirit or scope of the present invention. In the examples, all parts are parts by weight unless stated otherwise.

EXAMPLES

Multiple transfers were performed using a variety of heat transfer materials. Each heat transfer sheet contained one or more of the following layers: base layer; release coating layer; tie coating layer; base coating layer; print coating layer; top coating layer; and laser print coating layer. A detailed description of each layer follows.

Base Layers

BP1

BP1 was a size press saturated paper having a fiber content comprising about 78 wt % softwood bleached Kraft and about 22 wt % hardwood bleached Kraft. The basis weight of the sheet was 64 grams per square meter (gsm). The eight sheet Gurley porosity was 24 sec/100 cc. The saturant comprised 100 dry parts Airvol® 107 (polyvinyl alcohol from Air Products), 50 dry parts titanium dioxide slurry, and 9 dry parts of a sizing agent, Sunsize® 137 (stearated melamine resin from Sun Chemical). The mixture was applied at about 12.5% total solids content in water. The saturant pickup was 14 parts per 100 parts fiber weight.

BP2

BP2 was a bond paper from Neenah Paper, designated Avon 24 lb. Classic Crest. The basis weight was 90 gsm and the thickness was 4.5 mils.

Release Coating Layers

R1

Release coating R1 was a mixture of the following components:

| | |
|---|---|
| Hycar ® 26172 | 100 dry parts |
| polyethylene glycol 20M | 20 dry parts |
| Celite ® 263 | 30 dry parts |
| Nopcote ® C-104-50 | 25 dry parts |
| Triton ® X100 | 2 dry parts |

Hycar® 26172 is a hard acrylic latex available from B. F. Goodrich.

Polyethylene glycol 20M is a 20,000 molecular weight polyethylene glycol wax available from Union Carbide.

Celite® 263 is diatomaceous earth (de-glosser) available from MacEssen.

Nopcote® C-104-50 is a 50% solids emulsion of calcium stearate available from Henkel Corporation, Amber, Pa.

Triton® X100 is a nonionic surfactant available from Union Carbide.

The ingredients were dispersed in a Cowles mixer at 33 wt % total dry solids content. The release coating was applied to provide a dry coating weight of 13 gsm.

R2

Release coating R2 was a mixture of the following components:

| | |
|---|---|
| Hycar ® 26172 | 100 dry parts |
| Celite ® 263 | 30 dry parts |
| Nopcote ® C-104-50 | 20 dry parts |
| XAMA7 | 10 dry parts |
| Silicone Surfactant 190 | 8 dry parts |
| Tergitol ® 15-540 | 5 dry parts |

XAMA7 is an aziridine cross-linker available from B. F. Goodrich.

Silicone Surfactant 190 is available from Dow Corning.

Tergitol® 15-S40 is an ethoxylated alcohol surfactant available from BASF.

The pH of the release coating was adjusted to about 10 to avoid premature cross-linking. The ingredients were dispersed in a Cowles mixer at 40 wt % total dry solids content. The release coating was applied to provide a dry coating weight of 16 gsm.

R3

Release coating R3 was a mixture of the following components:

| | |
|---|---|
| Hycar ® 26172 | 100 dry parts |
| Celite ® 263 | 50 dry parts |
| Silicone Surfactant 190 | 8 dry parts |

The ingredients were dispersed in a colloid mill at 40 wt % total dry solids content. The release coating was applied to provide a dry coating weight of 11 gsm.

Tie Coating Layers

T1

Tie coating T1 was a mixture of the following components:

| | |
|---|---|
| Michleman 58035 | 100 dry parts |
| MPP6356 | 100 dry parts |
| Triton ® X100 | 3 dry parts |

Michleman Emulsion 58035 is a 35 wt % solids ethylene-acrylic acid emulsion from Michleman Chemical Company, Cincinnati, Ohio.

Micropowder MPP635 is a high-density polyethylene powder from Micropowders, Inc.

The ingredients were dispersed in a Cowles dissolver at 37.5 wt % total dry solids content in water. The tie coating was applied to provide a dry coating weight of 11 gsm.

T2

Tie coating T2 was a mixture of the following components:

| | |
|---|---|
| Michleman 58035 | 100 dry parts |
| Orgasol ® 3501 EXDNAT 1 | 40 dry parts |
| Triton ® X100 | 3 dry parts |

Orgasol® 3501 EXDNAT 1 is a 10 micron average particle size co-polyamide 6-12 available from Elf Atochem.

The ingredients were milled in a colloid mill. The total solids content was 30 wt % total dry solids in water. The tie coating was applied to provide a dry coating weight of 15 gsm.

Base Coating Layers

B1

Base coating B1 was a mixture of the following components:

| | |
|---|---|
| Michem ® Prime 4990R | 100 dry parts |
| Orgasol ® 3501 EXDNAT 1 | 40 dry parts |
| Tergitol ® 15-S40 | 2 dry parts |
| Polyox ® N60K | 0.2 dry parts |

Michem® Prime 4990R is an ethylene-acrylate copolymer available from Michelman, Chemical Company, Cincinnati, Ohio.

Polyox® N60K is a polyethylene oxide available from Union Carbide.

The total solids content was 31.8 wt % total dry solids in water. The pH of the coating solution was raised to about 10 with ammonia. Isopropyl alcohol was added in small amounts to control foaming. The base coating was applied to provide a dry coating weight of 15 gsm.

B2

Base coating B2 was a mixture of the following components:

| | |
|---|---|
| Michem ® Prime 4990R | 100 dry parts |
| Orgasol ® 3501 EXDNAT 1 | 70 dry parts |
| Tergitol ® 15-S40 | 3.5 dry parts |

The total solids content was 30 wt % total dry solids in water. The pH of the coating solution was raised to about 10 with ammonia. The base coating was applied to provide a dry coating weight of 16.5 gsm.

B3

Base coating B3 was a co-extruded film having the following components and component thicknesses:

| | |
|---|---|
| Nucrel ® KC500 | 1.0 mil. |
| Primacor ® 5980I | 0.8 mil. |

Nucrel® KC500 is an ethylene/methacrylic acid copolymer having a melt index of 500 available from Dupont. Primacor® 5980I is an ethylene-acrylic acid copolymer having a melt index of 200 available from Dow Chemical Company.

The Nucrel® KC500 side of the film was positioned on the paper side, while the Primacor® 5980I side of the film was away from the paper side.

B4

Base coating B4 was a mixture of the following components:

| | |
|---|---|
| Michem ® Prime 4990R | 100 dry parts |
| Orgasol ® 3501 EXDNAT 1 | 40 dry parts |
| Benzoflex ® 352 | 20 dry parts |
| MPP6356 | 20 dry parts |
| Triton ® X100 | 3.2 dry parts |

The pH of the coating solution was raised to about 10 with ammonia. The total solids content was 33 wt % total dry solids in water. The mixture was dispersed in a Colloid mill. The base coating was applied to provide a dry coating weight of 13 gsm.

B5

Base coating B5 was a mixture of the following components:

| | |
|---|---|
| Michem ® Prime 4990R | 100 dry parts |
| Orgasol ® 3501 EXDNAT 1 | 80 dry parts |
| MPP6356 | 20 dry parts |
| Tergitol ® 15-S40 | 4.8 dry parts |

The mixture was dispersed in a Colloid mill. The total solids content was 33 wt % total dry solids in water. The pH of the coating solution was raised to about 10 with ammonia. The base coating was applied to provide a dry coating weight of 15 gsm.

Print Coating Layers—Ink Jet

All ink jet print coats were dried at 85° C. to avoid a loss of porosity.

PI1

Ink jet print coating PI1 was a mixture of the following components:

| | |
|---|---|
| Michem ® Prime 4990R | 31 dry parts |
| Orgasol ® 3501 EXDNAT 1 | 100 dry parts |
| MPP6356 | 29 dry parts |
| Tergitol ® 15-S40 | 5 dry parts |
| Polyox ® N60K | 1 dry parts |

The mixture was dispersed in a Colloid mill. The total solids content was 32 wt % total dry solids in water. The pH of the coating solution was raised to about 10 with ammonia. The print coating was applied to provide a dry coating weight of 17 gsm. The coating was dried in a forced air oven at 85° C.

PI2

Ink jet print coating PI2 was a mixture of the following components:

| | |
|---|---|
| Michem ® Prime 4990R | 25 dry parts |
| Orgasol ® 3501 EXDNAT 1 | 100 dry parts |
| Tergitol ® 15-S40 | 5 dry parts |
| Triton ® X100 | 2 dry parts |
| Polyox ® N60K | 4 dry parts |
| Sodium carbonate | 1 dry parts |
| Zinc oxide Solution #1 | 5 dry parts |

Sodium carbonate is available from Aldrich Chemical Company, Milwaukee, Wis.

Zinc oxide Solution #1 is available from S. C. Johnson Wax Company as a solution in water and ammonia.

In this formulation, the Polyox® N60K acts as a rheology control agent and an ink viscosity modifier (to prevent bleeding of ink jet inks). The sodium carbonate acts as a buffer, which helps prevent discoloration of some inks (HP694 cyan in particular). Zinc oxide solution #1 acts as a cross-linker for the Michem® Prime 4990R.

The mixture was dispersed in a Colloid mill. The total solids content was 25 wt % total dry solids in water. The pH of the coating solution was raised to about 10 with ammonia. The print coating was applied to provide a dry coating weight of 17 gsm.

PI3

Ink jet print coating PI3 was a mixture of the following components:

| | |
|---|---|
| Michem ® Prime 4990R | 35 dry parts |
| Orgasol ® 3501 EXDNAT 1 | 100 dry parts |
| Tergitol ® 15-S40 | 5 dry parts |
| Alcostat ® 567 | 1 dry parts |
| Polyox ® N60K | 4 dry parts |

Alcostat® 567 is a poly(N,N-dimethylethylamino methacrylate), quaternized with methyl chloride, from Allied Colloids as a water solution.

The total solids content was about 25 wt % total dry solids in water. The mixture was dispersed in a Colloid mill. The pH of the coating solution was raised to about 10 with ammonia. The print coating was applied to provide a dry coating weight of 15 gsm.

PI4

Ink jet print coating PI4 was a mixture of the following components:

| | |
|---|---|
| Michleman 58035 | 35 dry parts |
| Orgasol ® 3501 EXDNAT 1 | 100 dry parts |
| Tergitol ® 15-S40 | 5 dry parts |
| Alcostat ® 567 | 1 dry parts |
| Polyox ® N60K | 4 dry parts |

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI5

Ink jet print coating PI5 was a mixture of the following components:

| | |
|---|---|
| Michleman 58035 | 35 dry parts |
| Orgasol ® 3501 EXDNAT 1 | 100 dry parts |
| Tergitol ® 15-S40 | 5 dry parts |
| Alcostat ® 567 | 1 dry parts |
| Polyox ® N60K | 1 dry parts |

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI6

Ink jet print coating PI6 was a mixture of the following components:

| | |
|---|---|
| Michleman 58035 | 35 dry parts |
| Orgasol ® 3501 EXDNAT 1 | 100 dry parts |
| IF1893 epoxy resin | 25 dry parts |
| Tergitol ® 15-S40 | 6 dry parts |
| Alcostat ® 567 | 1 dry parts |
| Polyox ® N60K | 4 dry parts |

IF1893 is a powdered epoxy resin available from H. B. Fuller, St. Paul, Minn.

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI7

Ink jet print coating PI7 was a mixture of the following components:

| | |
|---|---|
| Michleman 58035 | 35 dry parts |
| Orgasol ® 3501 EXDNAT 1 | 100 dry parts |
| Tone ® 0201 | 20 dry parts |
| Tergitol ® 15-S40 | 5 dry parts |
| Alcostat ® 567 | 1 dry parts |
| Polyox ® N60K | 4 dry parts |

Tone® 0201 is a liquid polycaprolactone available from Union Carbide, Danbury, Conn.

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI8

Ink jet print coating PI8 was a mixture of the following components:

| | |
|---|---|
| Michleman 58035 | 35 dry parts |
| Orgasol ® 3501 EXDNAT 1 | 100 dry parts |
| Ketjintax ® 8 | 20 dry parts |
| Tergitol ® 15-S40 | 5 dry parts |
| Alcostat ® 567 | 1 dry parts |
| Polyox ® N60K | 4 dry parts |

Ketjintax® 8 is N-ethyl-p-toluenesulfonamide available from Akzo Nobel Chemical, Inc., Dobbs Ferry, N.Y.

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI9

Ink jet print coating PI9 was a mixture of the following components:

| | |
|---|---|
| Michem ® Prime 4990R | 25 dry parts |
| Orgasol ® 3501 EXDNAT 1 | 100 dry parts |
| Benzoflex ® 352 | 25 dry parts |
| Zinc Stearate Disperso D | 10 dry parts |
| Tergitol ® 15-S40 | 5 dry parts |
| Calcium carbonate | 1 dry parts |
| Polyox ® N60K | 1 dry parts |

Zinc stearate Disperso D is a available from Witco Chemical Company, Houston, Tex.

In this formulation, calcium carbonate acts as a buffer. zinc stearate Disperso D, a water dispersible zinc stearate, acts as a dye mordant.

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI10

Ink jet print coating PI10 was a mixture of the following components:

| | |
|---|---|
| Michem ® Prime 4990R | 25 dry parts |
| Orgasol ® 3501 EXDNAT 1 | 100 dry parts |
| Benzoflex ® 352 | 25 dry parts |
| Tergitol ® 15-S40 | 5 dry parts |
| Calcium carbonate | 1 dry parts |
| Polyox ® N60K | 4 dry parts |

The total solids content was about 28 wt % total dry solids in water. The mixture was dispersed in a Colloid mill. The pH of the coating solution was raised to about 10 with ammonia. The print coating was applied to provide a dry coating weight of 17 gsm.

PI11

Ink jet print coating PI11 was a mixture of the following components:

| | |
|---|---|
| Michleman 58035 | 35 dry parts |
| Orgasol ® 3501 EXDNAT 1 | 100 dry parts |
| Benzoflex ® 352 | 25 dry parts |
| Tergitol ® 15-S40 | 5 dry parts |
| Alcostat ® 567 | 1 dry parts |
| Polyox ® N60K | 4 dry parts |

The total solids content was about 25 wt % total dry solids in water. The mixture was dispersed in a Colloid mill. The pH of the coating solution was raised to about 10 with ammonia. The print coating was applied to provide a dry coating weight of 19 gsm.

PI12

Ink jet print coating PI12 was a mixture of the following components:

| | |
|---|---|
| Michleman 58035 | 35 dry parts |
| Orgasol ® 3501 EXDNAT 1 | 100 dry parts |
| Benzoflex ® 352 | 50 dry parts |
| Tergitol ® 15-S40 | 5 dry parts |
| Alcostat ® 567 | 1 dry parts |
| Polyox ® N60K | 4 dry parts |

The total solids content was about 25 wt % total dry solids in water. The mixture was dispersed in a Colloid mill. The pH of the coating solution was raised to about 10 with ammonia. The print coating was applied to provide a dry coating weight of 19 gsm.

Print Coating Layers—Laser Color Copier

PL1

Laser Color Copier (LCC) print coating layer PL1 was a mixture of the following components:

| | |
|---|---|
| Michem ® Prime 4990R | 100 dry parts |
| Orgasol ® 3501 EXDNAT 1 | 80 dry parts |
| MPP6356 | 20 dry parts |
| Tergitol ® 15-S40 | 4.8 dry parts |

The pH of the coating solution was raised to about 10 with ammonia. The total solids content was about 33 wt % total dry solids in water. The mixture was dispersed in a Colloid mill. The print coating was applied to provide a dry coating weight of 15 gsm.

PL2

LCC print coating layer PL2 was a mixture of the following components:

| | |
|---|---|
| Michem ® Prime 4990R | 100 dry parts |
| Orgasol ® 3501 EXDNAT 1 | 40 dry parts |
| Benzoflex ® 352 | 20 dry parts |
| MPP6356 | 20 dry parts |
| Triton ® X100 | 3.2 dry parts |

The pH of the coating solution was raised to about 10 with ammonia. The total solids content was about 33 wt % total dry solids in water. The mixture was dispersed in a Colloid mill. The print coating was applied to provide a dry coating weight of 14 gsm.

Top Coat Layers

TP1

Top coating layer TP1 was an aqueous solution containing 2.5 wt % Methocel® A15, a methylcellulose available from Dow Chemical Company (Midland, Mo.), and 1.0 wt % alum. The top coating was applied to provide a dry coating weight of 0.5 gsm.

TP2

Top coating layer TP2 was an aqueous solution containing 2 wt % of Polyox® N60K. The top coating was applied to provide a dry coating weight of 0.3 gsm.

TP3

Top coating layer TP3 was a water solution of 2 wt % Polyox® N60K and 2 wt % calcium chloride, added as a dye mordant. The top coating was applied to provide a dry coating weight of 0.6 gsm.

TP4

Top coating layer TP4 was identical to top coating layer TP3, but top coating layer TP4 was applied to provide a dry coating weight of 1.5 gsm.

TP5

Top coating layer TP5 was an aqueous solution of 2 wt % Polyox® N60K and 5 wt % PEG300, a polyethylene oxide liquid from Union Carbide. The top coating was applied to provide a dry coating weight of 2.5 gsm.

TP6

Top coating layer TP6 was identical to top coating layer TP2, but top coating layer TP6 was applied to provide a dry coating weight of 0.8 gsm.

TP7

Top coating layer TP7 was an aqueous solution of 2 wt % Polyox® N60K and 0.5 wt % Alcostat® 567. The top coating was applied to provide a dry coating weight of 1.0 gsm.

EXAMPLE 1

Preparation of Heat Transfer Materials Having a Laser Color Copier Printed Image Thereon Three heat transfer materials were prepared from the above-described base layers and coating layers. The components of the heat transfer materials are shown below in Table 1. Images were copied onto the heat transfer materials using a Canon 700 laser color copier.

Transfers of the images were made using a hand ironing technique. All of the heat transfers were onto 100% cotton t-shirts or t-shirt material. A cushioning material was placed onto a hard surface. A t-shirt was then placed onto the cushioning material. Then, the heat transfer material was placed onto the t-shirt.

The heat transfer material was ironed for three minutes, applying pressure onto the heat transfer material. The ironing strokes were slow and in the longest direction of the heat transfer material. The iron used was a Procter-Silex model 17109 or 13117. The images were multi-colored test patterns covering nearly all the heat transfer material surface. The heat transfer material was removed after cooling.

Properties of the three heat transfer material are given below in Table 1.

TABLE 1

Laser Copier Designs Summary

| Sample | Base Paper | Release Coat | Tie Coat | Base Coat | Print Coat | Comments | Wash Test |
|---|---|---|---|---|---|---|---|
| CLC1 | BP1 | R1 | T1 | B5 | PL1 | 1,5 | 2 |
| CLC2 | BP1 | R1 | T1 | B4 | PL2 | 3,4,5 | 2 |
| CLC3 | BP2 | R3 | T1 | B4 | PL2 | 1,3 | 2 |

1 — good acceptance of toners and good cold peel transfer
2 — little color loss after 5 washes
3 — soft "hand"
4 — poor cold peel transfer
5 — tends to jam in color photocopier (Canon 700).

As can be seen in Table 1, Samples CLC2 and CLC3, which contained cyclohexane dimethanol dibenzoate in the base coating layer and print coating layer, exhibited a softer hand than Sample CLC1. The resulting coated fabrics of Samples CLC2 and CLC3 exhibited a hand similar to that of the fabric itself.

Example 2

Preparation of Heat Transfer Materials Having an Ink Jet Printed Image Thereon Heat transfer materials were prepared from the above-described base layers and coating layers. The components of the heat transfer materials are shown below in Table 2. Images were printed onto the heat transfer materials using an ink jet printer. All of the ink jet printable heat transfer materials were made with base layer BP1 and release coating layer R1.

TABLE 2

Ink Jet Design Summary

| Sample | Tie Coat | Base Coat | Print Coat | Top Coat | Comments | Print Test | Wash Test |
|---|---|---|---|---|---|---|---|
| IJ1 | T1 | B2 | PI2 | — | 1 | 1 | 1 |
| IJ2 | T1 | B1 | PI3 | — | 2 | — | 2 |
| IJ3 | T1 | B3 | PI4 | TP2 | 2 | 2 | 3 |
| IJ4 | T2 | B1 | PI4 | TP2 | 2,3 | 2 | 3 |
| IJ5 | T1 | B3 | PI6 | TP2 | 2 | 2 | 3 |
| IJ6 | T1 | B3 | PI5 | TP3 | 2,4 | 2 | 3 |
| IJ7 | T1 | B3 | PI7 | TP1 | 2 | 2 | 3,4 |
| IJ8 | T1 | B3 | PI8 | TP1 | 2 | 2 | 3,4 |
| IJ9 | T1 | B3 | PI9 | — | 2 | 1 | 3 |
| IJ10 | T1 | B3 | PI10 | — | 2 | 1 | 3 |

TABLE 2-continued

Ink Jet Design Summary

| Sample | Tie Coat | Base Coat | Print Coat | Top Coat | Comments | Print Test | Wash Test |
|---|---|---|---|---|---|---|---|
| IJ11 | T1 | B3 | PI11 | TP2 | 2 | 2 | 3,5 |
| IJ12 | T1 | B3 | PI11 | TP3 | 2,4 | 2 | 6 |
| IJ13 | T1 | B3 | PI11 | — | 2 | 3 | 6 |
| IJ14 | T1 | B3 | PI11 | TP4 | 2,4 | 2,4 | 3 |
| IJ15 | T1 | B3 | PI11 | TP5 | 2 | 2 | 6 |
| IJ16 | T1 | B3 | PI12 | TP6 | 2 | 2 | 6 |
| IJ17 | T1 | B3 | PI11 | TP4 | 2,4 | 2 | 3 |
| IJ18 | T1 | B3 | PI11 | TP8 | 2 | 2 | 3 |
| IJ19 | T1 | B3 | PI12 | TP4 | 2 | 2 | 3 |
| IJ20 | T1 | B3 | PI12 | TP7 | 2 | 2 | 3 |
| IJ21 | T1 | B1 | PI1 | — | 2 | 4 | 3 |
| IJ22 | TI | B1 | PI1 | — | 1 | 4 | 6 |

Comments

1. Transferred with a heat press, 30 sec. at 375° F.
2. Transferred with a hand iron
3. Difficult to cold peel paper after ironing.
4. Canon ink jet inks discolored and darkened when transferred.

Print Test

1. Printed well with a Hewlett Packard 694 printer
2. Printed well with Hewlett Packard 694, Canon BJ620, Canon BJ4200 with regular and photo inks; Canon BJ420 with regular and photo inks; and Epson 800 Stylus printers
3. Printed well with Hewlett Packard 694, Canon BJ620, Canon BJ4200, BJ240 and Epson 800 Stylus printers with regular inks; but not with Canon BJ4200 or BJ240 with photo inks (these bled some).
4. Printed well with Canon BJ600 and Epson Stylus 800 printers.

Wash Test

1. Washed well except for some fading of yellow ink from HP694 printer.
2. Cracking of image after five washes.
3. Very slight cracking of image after five washes
4. More fading of inks than IJ3.
5. Softer feel after washing than IJ3.
6. No cracking of image. Good wash test.

As shown in Table 2 above, Samples IJ1 to IJ8 and IJ21 to IJ22 (Group 1) did not contain cyclohexane dimethanol dibenzoate in the print coating layer; Samples IJ9 to IJ20 (Group 2) did contain cyclohexane dimethanol dibenzoate in the print coating layer. The transferability and printability of Group 2 samples was found to be similar to that of the Group 1 samples. Both groups of samples were successfully transferred with little discoloration of the printed image. Further, both groups of samples exhibited good versatility in regard to use with a variety of printers and inks. However, the samples of Group 2 exhibited better wash test results overall compared to the samples of Group 1.

Samples IJ12, IJ13, IJ15, and IJ16 exhibited (1) no cracking of the image and (2) very little, if any, fading of the image after five washings. Further, these four samples also exhibited excellent printability, showing good print results with every printer and ink used. Moreover, Samples IJ9 to IJ11, IJ14, and IJ17 to IJ20 exhibited very little cracking of the image after five washings.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A printable heat transfer material comprising:

a base substrate; and a transferable coating thereon, wherein the coating comprises a binder and cyclohexane dimethanol dibenzoate, further wherein the coating has a thickness greater than 1.0 mil.

2. The heat transfer material of claim 1, wherein the base substrate comprises a cellulosic nonwoven web or a polymeric film.

3. The heat transfer material of claim 1, wherein the transferable coating further comprises thermoplastic particles, a cationic polymer, or a combination thereof.

4. The heat transfer material of claim 3, wherein the thermoplastic particles comprise polyethylene particles, polyolefin particles, polyester particles, polyamide particles, ethylene-vinyl acetate copolymer particles, copolyamide particles, or a combination thereof; and the film-forming binder comprises polyacrylates, polyethylenes, ethylene-acrylic acid copolymer, a ethylene/methacrylic acid copolymer, or a combination thereof.

5. The heat transfer material of claim 4, wherein the transferable coating compares from about 10 wt % to about 90 wt % cyclohexane dimethanol dibenzoate; from about 90 wt % to about 10 wt % thermoplastic particles; and from about 10 wt % to about 90 wt % film-forming binder, based on the total weight of the coating.

6. The heat transfer material of claim 3, wherein the transferable coating comprises from about 2 wt % to about 20 wt % of a cationic polymer based on the total weight of the coating.

7. The heat transfer material of claim 6, wherein the cationic polymer comprises an amide-epichlorohydrin polymer, a polyacrylamide with cationic functional groups, a polyethyleneimine, a polydiallylamine, or a combination thereof.

8. The heat transfer material of claim 6, wherein the transferable coating further comprises a dispersent, a surfactant, and a buffer.

9. The heat transfer material of claim 4, wherein the transferable coating is a melt extruded coating.

10. The beat transfer material of claim 1, further comprising one or more layers between the substrate and the transferable coating, wherein the one or more layers comprise a release coating layer, a tie coating layer, or a combination thereof.

11. The heat transfer material of claim 1, further comprising one or more layers overlaying the transferable coating, wherein the one or more transferable layers comprise a print coating layer, a top coating layer, or a combination thereof.

12. The heat transfer material of claim 1, wherein the transferable coating comprises, in order, a release coating layer, a tie coating layer, a base coating layer, and a print coating layer.

13. The heat transfer material of claim 12, further comprising a top coating layer on the print coating layer.

14. The heat transfer material of claim 1, wherein the cyclohexane dimethanol dibenzoate has a particle size of less than 50 microns.

15. The heat transfer material of claim 8, wherein the cyclohexane dimethanol dibenzoate has a particle size of from about 1 micron to about 30 microns.

16. The heat transfer material of claim 1, further comprising an image printed on the transferable coating.

17. The heat transfer material of claim 16, wherein the image is capable of being transferred onto a fabric.

18. A heat transfer material comprising a base substrate and a printable, heat-fusible transferable coating comprising from about 10 wt % to about 90 wt % cyclohexane dimethanol dibenzoate, from about 90 wt % to about 10 wt % thermoplastic particles, and form about 10 wt % to about 90 wt % film-forming binder, based on the total weight of the coating.

19. A process for making an article of manufacture comprising the steps of providing a layer of fabric;

providing an article comprising a base substrate with a transferable coating thereon, wherein said coating comprises a binder and cyclohexane dimethanol dibenzoate, and wherein the coating possesses a thickness of greater than 1 mil;

printing the transferable coating to provide an image;

contacting the image-bearing side of said article to the fabric; and applying heat to the image-bearing coating to transfer the image onto the surface of the fabric.

* * * * *